Patented May 20, 1952

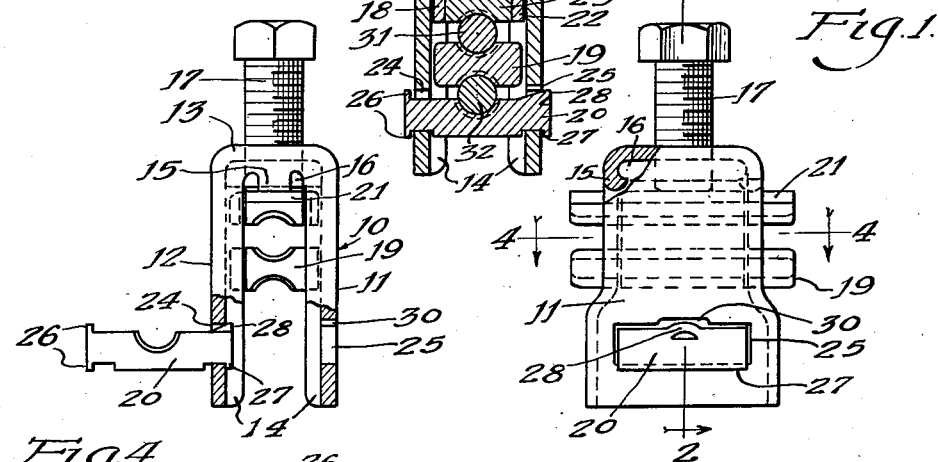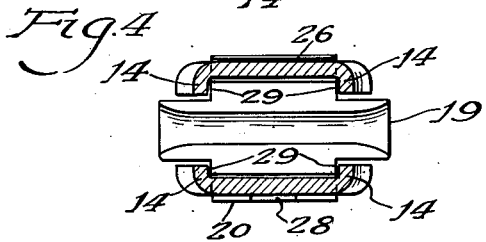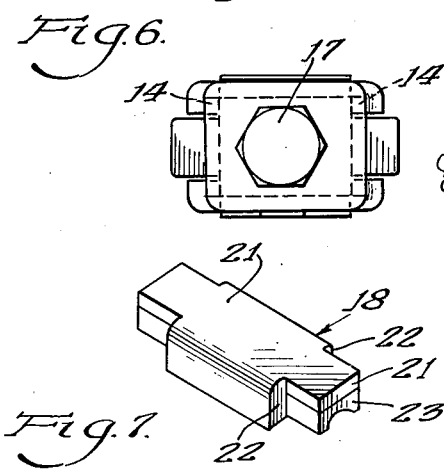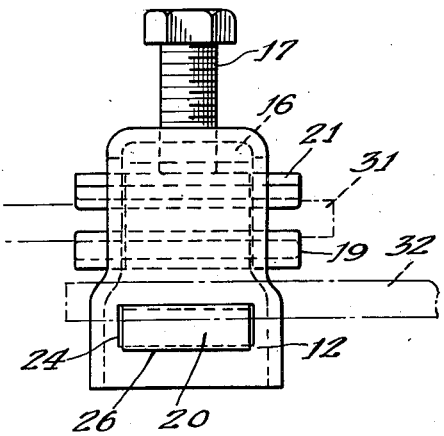

2,597,070

UNITED STATES PATENT OFFICE 2,597,070

WIRE CLAMP

John Brown Cook and Leonard L. Jugle, Chicago, Ill., assignors to Reliable Electric Company, Chicago, Ill., a corporation of Illinois Application May 8, 1946, Serial No. 668,107

4 Claims. (Cl. 287—75)

This invention relates to improvements in wire clamps of the general type shown in Patent No. 2,117,725.

It is an object of this invention to provide a wire clamp which exerts a vibration dampening effect on one of the wires clamped. Thus, this invention is particularly well adapted for use in connection with transmission line wires. In a device of this type it is frequently desired to attach a tap wire to the transmission line wire. In other situations, it is of utility when a line wire is dead ended around a spool; then the tail of the loop will be clamped to the line wire by means of the clamp shown.

Another object is to provide a clamp which is particularly well adapted for use with aluminum line wires, inasmuch as the portions of the line wire clamping jaws which contact the aluminum wire, may be made of a comparatively soft metal, such as aluminum. Thus, the aluminum line wire will not be damaged. In the present invention, this advantage is obtained without eliminating the use of suitable hard materials for the screw threaded means which exert the clamping action.

A further object of this invention is to provide an improved clamping means of the type indicated which has a minimum number of separable parts, thus facilitating the use of the clamp.

Other objects, features and advantages will become apparent as the description proceeds.

With reference now to the drawings, in which the reference numerals designate like parts—

Fig. 1 is an elevation, partially broken away, showing a preferred embodiment of this invention;

Fig. 2 is a section taken substantially along line 2—2 of Fig. 1;

Fig. 3 is an end view, partially broken away, showing the parts in a changed position;

Fig. 4 is a sectional view taken along line 4—4 of Fig. 1;

Fig. 5 is a rear elevation;

Fig. 6 is a top view; and

Fig. 7 is a perspective view of the upper line clamping jaw.

The clamp comprises a body portion 10 in the form of a U-shaped piece, provided with legs 11 and 12 and a connecting portion 13. As shown in Fig. 4, legs 11 and 12 are provided with inwardly directed flanges 14. The connecting portion 13 is provided with oppositely disposed ears 15, as shown in Fig. 1. These ears are bent inwardly to hold a nut 16 in place against the under surface of the connecting portion 13. The nut is merely a rectangular piece of hard metal, preferably steel, which is tapped so as to accommodate a bolt 17. The bolt also extends through the connecting portion 13, which is similarly tapped.

The lower portions of the legs 11 and 12 are provided with aligned openings 25 and 24, respectively. A bridging member 20 is removably disposed in said openings.

Between the bridging member 20 and the nut 16 are disposed two slidable clamping jaws referred to as a composite member 18, and a spacer 19. The composite member 18, as shown in Fig. 7, comprises a backing member 21 formed of a hard material, such as a hardened aluminum alloy or steel. The backing member is in the form of a strip having bent down ears 22, as shown in Fig. 7. Between the ears is disposed an insert of soft metal, such as aluminum, which is adapted to contact the line wire. The parts 21 and 23 may be associated by means of a force fit, or if desired, the members may be dimensioned so as to provide a loose fit, and then the ears squeezed together after assembly.

The spacer 19 serves to separate the line wire 31 and the tap, or other wire 32, as well as to exert a clamping action. The composite member 18, the spacer 19, and the bridging member 20 are all grooved so as to afford a greater surface area for contact with the wires 31 and 32.

The bent over ears 22 of the composite member 18 provide shoulders which engage the flanges 14, thus confining the composite member within the body portion 10. Similarly, the spacer 19 is provided with shoulders 29 which engage flanges 14. Both of these members extend laterally beyond the confines of the body portion 10 so as to provide a greater area of contact with the line wire 31. Due to this feature, the clamp exerts a vibration damping action upon the line wire, and also provides a better distribution of the clamping force. This is of special importance when the clamp is used with aluminum wires, since an undue concentration of the clamping force will damage the wire.

The opposite ends of the bridging member 20 are provided with enlarged portions which cooperate with the openings 24 and 25 to prevent complete separation of the bridging member from the body portion. As shown in the figures, one end of the bridging member is provided with flanges 26, the distance between the edges of the flanges being greater than the height of the opening 24. Thus, the bridging member may be shifted toward the left, as viewed in Fig. 3, from an operative position to an inoperative position, but the flanges 26 prevent a similar shifting in a right hand direction. The right hand end of the bridging member is provided only with a single flange 27, but the upper edge of the right hand end is provided with an upset portion 28 so that the right hand end at this point is of greater dimension than the height of the opening 24. In the opening 25, however, at a point opposite the upset portion 28, a cut-out 30 is provided, which permits the shifting of the parts from the Fig. 2 to the Fig. 3 position. Since a similar cut-out portion is not provided in the opening 24, complete separation of the parts is prevented.

It will be noted in Fig. 3 that the width of the spacer 19 is such as to permit the spacer to be withdrawn past the upset portion 28 and the flange 27, thereby permitting complete separation of the spacer from the body portion. However, the composite member is of a width sufficiently great so that it cannot be withdrawn.

The bridging member is preferably formed of a somewhat harder material than the spacer 19 so as to form a point of reaction for the other elements of the clamp.

In operation, the bridging member 20 is shifted to its inoperative position, as shown in Fig. 3, and the spacer 19 is then withdrawn. The clamp is then slipped over the line wire 31, the spacer 19 replaced, and the tap wire 32 placed in the lower groove of the spacer. The bridging member 20 is then returned to its operative position as shown in Fig. 2, and the bolt 17 is tightened up until the wires are securely clamped.

Although only a preferred embodiment of this invention has been shown and described herein, it is obvious that various modifications and changes may be effected in the construction shown without departing from the spirit of the invention as defined in the appended claims.

We claim:

1. A wire clamp comprising a U-shaped body member having inwardly directed flanges on the legs thereof, a bolt passing through the connecting portion of said body member, a pair of slidably mounted clamping jaws having shoulders engaging said flanges whereby said clamping jaws may be confined within said body member, said clamping jaws having portions extending laterally beyond the confines of said body member to provide an increased clamping area, the lower portion of said U-shaped body member being provided with aligned openings, a bridging member removably disposed within said openings, one of said clamping jaws being a composite member positioned for engagement by said bolt and comprising a backing element in the form of a strip of hard metal having bent-down ears and a wire contacting element of comparatively soft metal disposed adjacent said strip, said bent-down ears being in gripping engagement with said wire contacting element to hold the same in place, and constituting the shoulders of said last-mentioned jaw, said bolt engaging said backing element.

2. A wire clamp comprising a U-shaped body member having oppositely disposed legs provided with inwardly directed flanges and a connecting portion, a nut disposed adjacent said connecting portion, ears on said connecting portion which are bent around the lateral edges of said nut to secure the same in place, a bolt passing through said connecting portion and nut, said legs being provided with aligned openings, a bridging member removably disposed within said openings, and a pair of clamping jaws slidably disposed in said body member between said bolt and said bridging member, the clamping jaw nearest to said bolt being a composite member comprising a backing element engaged by said bolt and being in the form of a strip of hard metal having bent-down ears providing shoulders for engagement with said flanges, and a wire contacting element of comparatively soft metal disposed adjacent said strip and held in place by said ears, said wire contacting element and said backing element being extended laterally in both directions beyond said ears.

3. In a wire clamp having a U-shaped body member provided with inwardly directed flanges on the legs thereof, a clamping jaw for sliding movement within said body member comprising a backing element in the form of a strip of hard metal having bent down ears providing shoulders for engagement with said flanges, and a wire contacting element of comparatively soft metal disposed adjacent said strip and held in place by said ears, said wire contacting element and said backing element being extended laterally in both directions beyond said ears.

4. A connector of the type described comprising a U-shaped body member, the legs of which are provided with oppositely disposed openings, a bridging member disposed in said openings and extending across the space between said legs when in operative position, the end portions of said bridging member being larger than one of said openings, so as to limit the sliding movement of said bridging member through the corresponding leg of said body member, and the other of said openings being larger than that end portion of said bridging member which normally extends therethrough, said U-shaped body member being provided with inwardly directed flanges, two clamping jaws slidably disposed within said U-shaped body member and each being provided with central portions of increased width so as to provide shoulders for engagement with said flanges whereby said clamping members may be confined within said body member when said bridging member is in normal position, the width of the central portion of the clamping jaw nearest to said bridging member being such as to permit the clamping jaw to be entirely removed from said body member when said bridging member is shifted into non-operative position, and the width of the central portion of the other clamping jaw being sufficient as to prevent such removal, and a bolt passing through the connecting portion of said body member, the clamping jaw nearest to said bolt being a composite member comprising a backing element of hard material for engagement with said bolt, and a wire contacting member of comparatively soft material secured to said backing member, said wire contacting element and said backing member being extended laterally in both directions beyond the confines of said body member to distribute the force applied by the bolt over a substantial area, and the clamping member nearest to said bridging member being similarly extended so that the clamping force exerted by both of said clamping jaws tends to exert a vibration dampening effect on a wire clamped thereby.

JOHN BROWN COOK.
LEONARD L. JUGLE.

REFERENCES CITED

The following references are of record in the file of this patent:

UNITED STATES PATENTS

| Number | Name | Date |
| --- | --- | --- |
| 1,873,559 | Dibner | Aug. 23, 1932 |
| 1,979,091 | Alsaker et al. | Oct. 30, 1934 |
| 2,210,750 | Cook et al. | Aug. 6, 1940 |

FOREIGN PATENTS

| Number | Country | Date |
| --- | --- | --- |
| 674,210 | France | Oct. 15, 1929 |